April 11, 1967    R. L. GASTINEAU    3,313,553

SEALING RING

Filed April 17, 1964

INVENTOR.
ROBERT L. GASTINEAU
BY J E Beauger
His ATTORNEY

United States Patent Office 3,313,553
Patented Apr. 11, 1967

3,313,553
SEALING RING
Robert L. Gastineau, Dayton, Ohio, assignor to United Aircraft Products, Inc., Dayton, Ohio, a corporation of Ohio
Filed Apr. 17, 1964, Ser. No. 360,512
7 Claims. (Cl. 277—229)

This invention relates to sealing rings, particularly as used in static installations to seal against a loss of pressure fluids.

The invention has a special, although not limited, reference to metallic O-rings, it being an object of the invention to use O-rings as heretofore known merely to impart load resistance and spring-back characteristics while the sealing proper is done by a separable surrounding jacket member.

Another object of the invention is to obviate a need for the making of a precise joint between the ends of the metallic O-ring, the invention comprehending a use of poorly welded rings heretofore discarded as scrap and even of non-welded rings.

A further object of the invention is to provide a generally new sealing ring characterized by an outer jacket providing sealing surfaces and capillary attraction and comprising an inner core providing load resistance and spring-back characteristics, the jacket and core being separable members assembled together to define the sealing ring.

Still another object of the invention is to prevent a sealing ring characterized as in the foregoing wherein the core element is a hollow metallic O-ring self-energized to obviate separation of the jacket and inner ring member under the influences of fluid pressure.

In the drawings, FIG. 1 is a view in longitudinal section, partly diagrammatic, of an installed sealing ring in accordance with a first illustrated embodiment of the invention, the sealing ring being shown installed in a groove in a joint prior to application of loading forces thereon;

Figure 1:
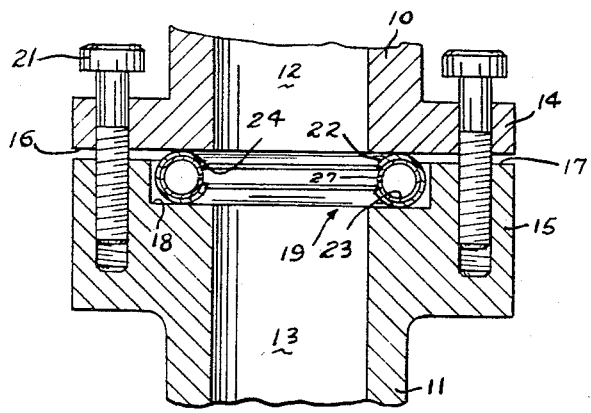
Figure 2:
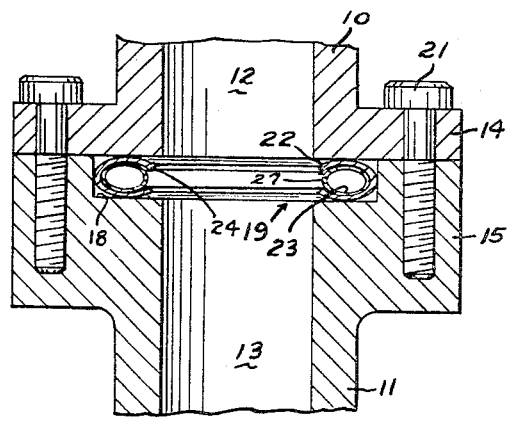
FIG. 2 is a view similar to FIG. 1, showing the sealing ring after application of the compression loading forces.

Referring to the drawings, a typical embodiment of a sealing ring in accordance with the instant invention may find it installed in a joint as shown in FIGS. 1 and 2. Thus a pair of pipe-like members 10 and 11 are disposed in end to end relation to align longitudinal through openings 12 and 13 therein. The members 10 and 11 have respective mating flanges 14 and 15 presenting to one another opposing planar surfaces 16 and 17. In the surface 17 is a groove 18. A sealing ring 19 is installed in groove 18. The flanges 14 and 15 are adapted to be clamped together, as by means of bolts 21 disposed outwardly of the groove 18. Sealing ring 19 has a height or diameter normally exceeding the depth of groove 18. Accordingly, in the process of clamping together the flanges 14 and 15 a compression load is applied to the sealing ring, such compression load being limited by interengagement of the faces 16 and 17. The arrangement is one to apply pressure to the sealing ring 19 at opposed points at the bottom of groove 18 and on surface 16 in a manner to inhibit an escape of pressure fluid through or out the joint represented by the mating flanges 14 and 15.

Figure 3:
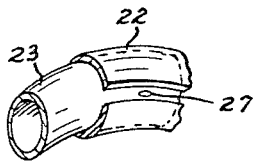
FIG. 3 is a detail fragmentary view in perspective of a sealing ring as shown in FIGS. 1 and 2.
Figure 4:
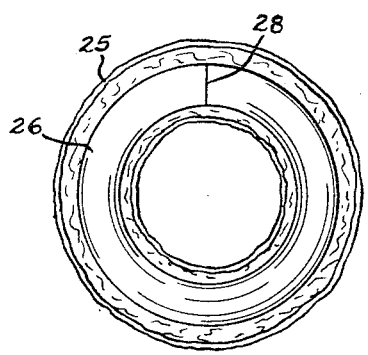
FIG. 4 is a view of a sealing ring mounted in superposed relation to a jacket prior to the jacket being formed thereover, the jacket here shown being different from the one of FIGS. 1–3 and, FIG. 5 is a view similar to FIG. 2, fragmentary in form, and showing an alternate embodied form of the sealing ring of the invention.

In accordance with the instant invention the sealing ring 19 is a fabricated device comprising an outer jacket or shield 22 and an inner core member 23. The jacket 22 may be made of any material convenient to or suited to a particular use, including both organic and inorganic materials. It is formed to a substantially C-shape in cross-section, describing a full circle except for a relatively short space 24 between opposing side edges thereof. The jacket is, in this connnection, ring-shaped or annular in configuration. It may be so formed by rolling a strip of material to a C-shape as shown, coiling the resulting tubular device to a hoop shape and finally butting and welding its ends together. According to another possible method of manufacture the jacket is initially stamped or otherwise cut from sheet material to a flat ring configuration. It is then suitably spun or rolled to the C cross-sectional shape. The core element 23 is received in the jacket 22 to be fully enclosed thereby except for the space 24. The core may be installed in the jacket in any convenient manner, as for example by spreading apart the free edges of a formed jacket and inserting the core and then allowing the jacket to return to its normal position or to reform it to such position. Also, and in the case of the ring-shaped stamping, the core may be placed in superposed relation upon the ring shaped stamping, with the latter being folded over the core in the subsequent spinning or rolling operation. In the drawings the jacket of FIGS. 1, 2 and 3 is made of a metallic material formed according to either of the above described methods. In FIG. 4 a jacket 25 is shown made at least in part of fibrous materials and according to the second described method whereby the jacket is initially stamped and subsequently roller or spun over a superposed core element 26.

The core part of the sealing ring 19 may also be made of materials convenient and suited to a particular use. One of its functions is to resist compression of the jacket 22 when clamped between the flanges 14 and 15. From this standpoint the core may be either a solid metal or an elastomeric solid. However, a principal use of sealing rings of the present class is in installations subject to very high fluid pressures. These pressures may deform or collapse elastomeric materials. Solid metals have but slight resilience and so are unable to follow a deflection or separation of the surfaces 16 and 17 as might result from extreme pressures as well as from differing responses to high temperature. Accordingly, a preferred form of the invention finds the core element 23 to be a hollow metallic tube having a diameter properly to be received within the jacket 22 and coiled to a ring shape in correspondence with the jacket. While the interior of the ring 23 may be closed for low or moderate pressure installations, for purposes of general utility the tube is formed with one or more through openings 27 in the side thereof, the location of such opening or openings being predetermined to lie in a part of the tube uncovered by the jacket 22. According to a further feature of the invention both the open jacket space 24 and the core openings 27 are arranged to face in the direction of highest encountered pressure. As a result the fluid pressure under control has access through the space 24 to the inner surface of the jacket 22, in a manner tending to balance any tendency of the pressures to squeeze the upper surface of the jacket away from sealing surfaces 16 and 18. The openings 27 in core element 23 admit the same fluid pressure to the interior of the core element as exists outside it. Hence the core element is enabled to maintain a continuous close fitting contact with the jacket irrespective of deflection or separation of the flanges 14 and 15.

The sealing ring 19 has normally a generally round shape in cross-section, as shown in FIG. 1. In response to tightening of the bolts 21, however, the sealing ring is compressed, assuming a generally oval configuration in cross-section as shown in FIG. 2. Inner core element 23 resists this compression with a natural resilience, endeavoring to restore itself to its normal condition of roundness with the result that continuous mechanical pressure is applied through the jacket 22 to the surfaces 16 and 18. Separating motions of the flanges 14 and 15 are compensated for by an expanding movement of the core element maintaining the sealing pressure against faces 16 and 18. In the presence of openings 27 in the inner core this action is carried out independently of fluid pressure, the pressures inside and outside the ring being balanced.

As shown in the embodiment of FIG. 4, the free ends of the inner core element may abut one another in a joint 28. The butting ends may be welded together. According to a feature of the invention, however, these ends need not be welded together and, indeed, may even overlap one another. The inventive concept is one in which the jacket 22 or 25 effects the sealing, at opposed points at right angles to a plane passing through space 24, with the inner core element functioning merely to provide resistance and spring-back characteristics helping the jacket to establish and to maintain sealing contact with the opposing flange surfaces. Thus through use of a surrounding jacket a metallic O-ring may be relieved of the necessity of being formed with a precise weld, obviating problems of excessive scrap and considerably reducing the cost of manufacture.

Figure 5:
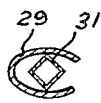

While the inner core element is conventionally round in cross-section it may assume other shapes, for example the diamond shape shown in FIG. 5. Here a jacket 29 like the jackets 22 and 25 receives in its interior a core element made of hollow tubing which is square-like and turned on edge to present a diamond shape in cross-section. Upper and lower edges of the element 31 engage diametrically opposed surfaces on the interior of jacket 29. A feature of the diamond shaped core is its ability to concentrate load forces and resistance thereto along narrow, nearly linear lines with a consequent better utilization of the available inherent resilience of the inner core element. The device 31 may have its interior open to the higher pressure side of the sealed joint in the manner of the ring 23.

In all illustrated instances the jackets may be coated or plated with a relatively soft material for better capillary attraction, that is ability to flow into the minute grooves and imperfections in the flange surfaces.

What is claimed is:
1. An O-ring for static sealing installations, comprising a hollow thin wall metal ring of a compressible resilient construction, said ring being continuous in cross section, and a relatively thicker jacket in enfolding relation to said ring, said jacket being a separable member assuming a C-shape independently of said ring and receiving the ring therein, said ring contacting said jacket at least at opposed points therein representing top and bottom locations in said C configuration and providing resistance and spring back to said jacket, compression loads being applied to upper and lower surfaces of said jacket exteriorly thereof at said locations, the separated ends of said jacket exposing an annular area on a side of said ring, said jacket being placed on said ring to expose a side thereof which in the use of the ring will face the higher pressure.

2. An O-ring according to claim 1, characterized in that the said separated ends of said jacket are separable for access of pressure to the interior of said jacket for self-energizing thereof independently of said metal ring.

3. An O-ring according to claim 1, characterized in that said metal ring is a hollow metal tube round in cross section, said tube having at least one opening to its interior located in said exposed annular area whereby the resistance and spring back provided by said metal ring may be accomplished independently of fluid pressure.

4. An O-ring according to claim 1, characterized in that said metal ring is a hollow tube square in cross section and disposed on edge to define a diamond shape and to present narrow edges to engage said jacket at said locations in support of said sealing surfaces.

5. An O-ring according to claim 1, characterized in that said metal ring is a hollow metal tube round in cross section, said jacket being in continuously contacting relation to the surface of said tube with its ends separable therefrom under applied fluid pressure for self-energizing of said jacket independently of said metal ring.

6. An O-ring according to claim 1, characterized in that said jacket is made of a material soft relative to the material of which said metal ring is made and providing for improved capillary flow into irregularities of sealed surfaces.

7. An O-ring according to claim 1, characterized in that said metal ring is a hollow tube the ends of which are in a mutually contacting unjoined relation.

References Cited by the Examiner

UNITED STATES PATENTS

| 2,967,727 | 1/1961 | Wills | 277—229 |
| 3,188,100 | 6/1965 | Delgado | 277—235 |

FOREIGN PATENTS

| 680,277 | 2/1964 | Canada. |
| 6,243 | 2/1894 | Great Britain. |

LAVERNE D. GEIGER, *Primary Examiner.*

D. MASSENBERG, *Assistant Examiner.*